April 7, 1970 R. L. HIGHNOTE 3,504,831
LOAD CARRYING BUMPER HITCH
Filed Dec. 17, 1968 2 Sheets-Sheet 2
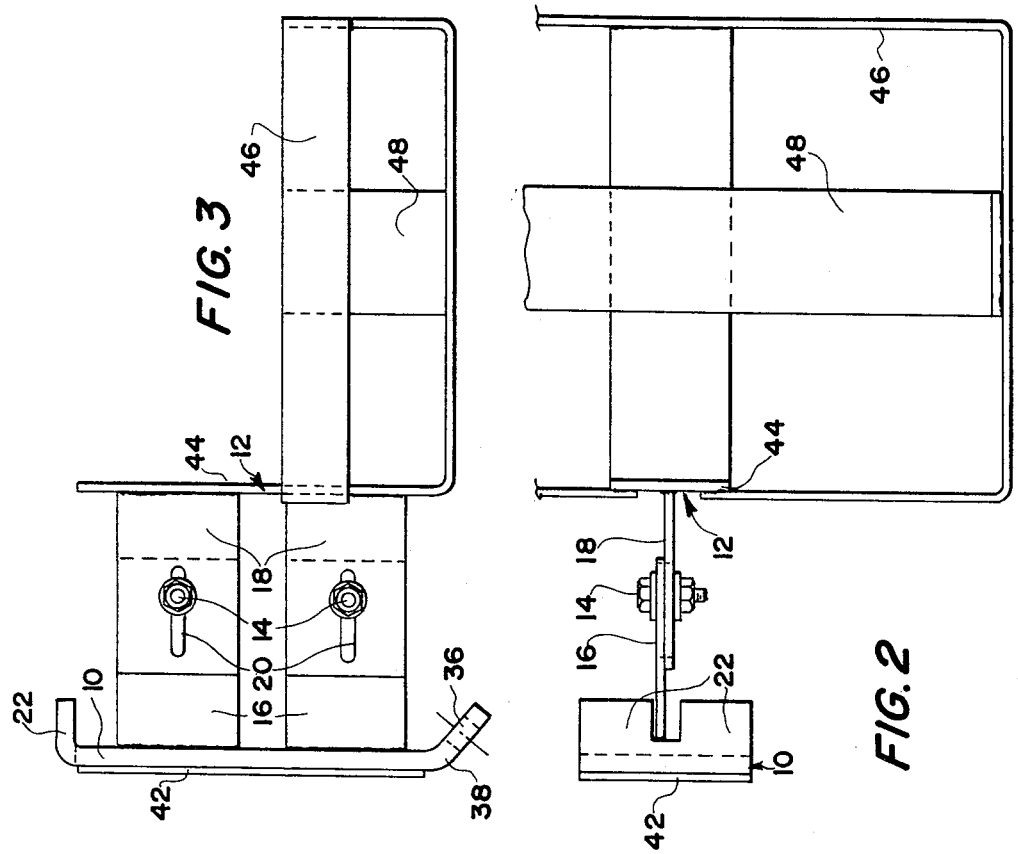
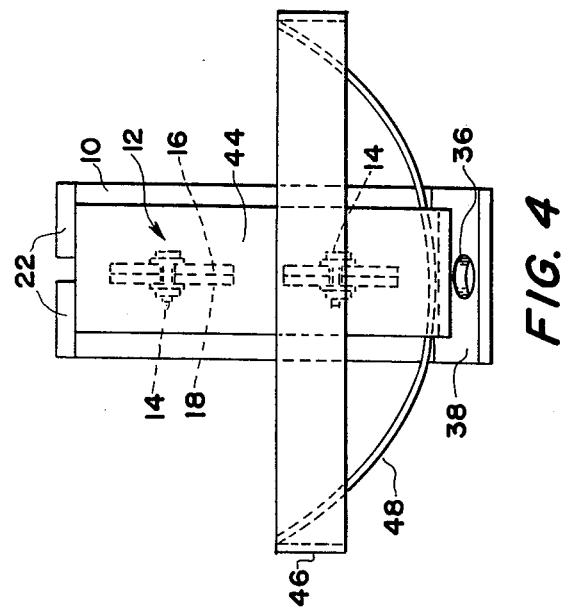
INVENTOR
RONNIE L. HIGHNOTE
BY Walter S. Pawl.
ATTORNEY

United States Patent Office 3,504,831
Patented Apr. 7, 1970

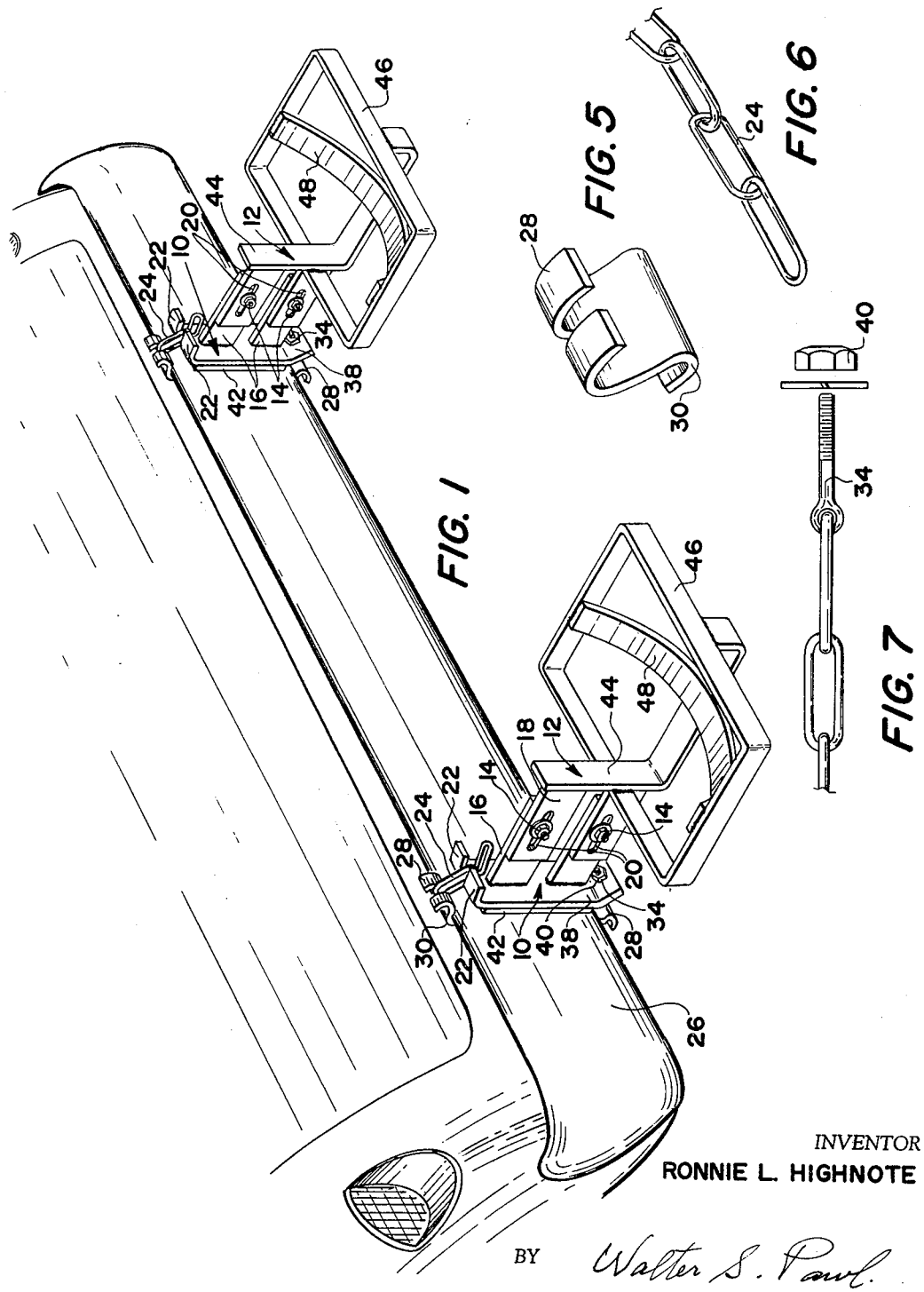

3,504,831
LOAD CARRYING BUMPER HITCH
Ronnie L. Highnote, 139 E. Oak St.,
Alexandria, Va. 22301
Filed Dec. 17, 1968, Ser. No. 784,395
Int. Cl. B60r 9/10
U.S. Cl. 224—42.03        3 Claims

ABSTRACT OF THE DISCLOSURE

This invention comprises a bracket having means for mounting it securely on an automobile bumper with vertical plate means having a plurality of vertically spaced substantially horizontal slots therein, and a load carrying bracket having similar plate means with matching slots, connected by bolts passed through corresponding slots in both plate means for tightening to fix the brackets in any angular and axial relative adjustment between the brackets in the vertical plane, within the range of the slot lengths and spacings. The load carrying bracket may be designed for any specific needs, the one illustrated comprising a minibike tire rack, whereby a minibike may be carried by a pair of these brackets mounted in properly spaced relation and adjustment on the bumper.

---

The prior art discloses many varieties of load carrying bumper mounted brackets, mostly not adjustable. Two of the references found, disclose such brackets having limited adjustability in the vertical plane: Patents Nos. 3,240,455 and 3,300,111. These appear to be much less stable, however, and are inherently weaker and have very limited ranges of angular and spacial adjustments in the vertical plane.

The object of the present invention is to provide a sturdy load carrying bumper hitch or bracket structure for supporting heavy loads safely, and having substantial angular and spacial adjustment in the vertical plane.

A further object is to provide a strong pivotally and spacially adjustable joint between plate members clamped together at more than one point in a selected adjustment.

A further object is to provide an equally strong bracket mounting on any bumper having any one of a wide range of sectional configurations and dimensions.

Other and more specific objects will become apparent in the following detailed description of one form of the invention adapted for the carrying of a minibike on the rear bumper of an automobile, as illustrated in the accompanying drawings wherein:

FIG. 1 is a perspective view of one specific application of the novel bumper hitch, FIG. 2 is a plan view of the brackets with their plate means clamped together, FIG. 3 is a side elevation thereof, FIG. 4 is a rear view of the same assembly, FIG. 5 is a perspective view of one of the bumper edge mounting chain hooks, FIG. 6 shows a portion of a chain used at the top of the bumper mounting bracket, and FIG. 7 shows an end portion of the lower chain with a take-up bolt for connection to the bumper mounting bracket.

The average motorist often finds it necessary to transport various kinds of appliances, mowers, bicycles, scooters, minibikes, etc., which are subject to damage when carried loosely in the car trunk or even in a sufficiently large station wagon or truck without carefully installing proper hold-down or mounting supports.

Sometimes it is a matter of convenience to carry an accessory load or even a secondary means of local transportation for use after arriving at a distant destination, such as a minibike, scooter or bicycle, which are awkward to pack in the average car without causing damage to the accessory or the car or both, during extensive travel.

A bumper hitch of the type herein disclosed, having an angular and translational adjustment between its bumper mounting bracket and its load carrying bracket, has solved these problems of transporting accessory loads such as above mentioned with ease and considerably more safety from damages. These bumper mounted brackets can be adapted readily to carry any type of accessory loads in suitable support brackets which are easily adjustable both angularly and spacially with relation to the bumper, so as to clear the load of any bumping or rubbing contact with the car body during transportation, thus preventing injury to either.

The support brackets illustrated are adapted to hold a minibike wheel and tire, so that two of these brackets may be mounted in properly spaced and adjusted positions on a bumper to conveniently and safely carry a minibike thereon. However, other brackets suitable for different types of accessory loads—from a tire support bracket to a plain shelf rack—may be adapted for use with the present adjustable bumper hitch.

Referring now to the drawings, the bumper mounting bracket 10 is fixed to the load carrying bracket 12 by means of bolts 14 clamping the vertical plates 16, 16 extending from bracket 10, to the plates 18, 18 which extend from bracket 12. Each plate 16 is provided with a slot 20 through which the bolts 14 are passed. When the bolts are loosened, the brackets may be adjusted relatively to each other angularly and/or translationally in the plane of the plates within the ranges of the slidably intersecting slots in which the bolts are engaged. Upon desirable adjustment, the bolts may be tightened to maintain them firmly in that fixed adjustment. There being more than one bolt to frictionally retain the plates against relative displacement by high load stresses, this clamping joint will obviously support greater loads with a higher factor of safety than a single bolt joint of a similar type.

The bumper mounting bracket 10 is a flat strip of strong material, preferably metallic, and has a pair of spaced ears 22 bent rearwardly at its upper end to produce a chain link catch for one end of a chain 24 passed over the top of a bumper 26, the other end of the chain being caught over the split hook end 28 of a chain hook the other end 30 of which is hooked over the upper front edge of the bumper 26.

Another bumper mounting chain hook is similarly hooked over the lower front edge of the bumper 26, and a chain 32 is caught over its split hook end 28 at the proper link, so that the take-up bolt 34 at its other end just passes through a bolt hole 36 in the angularly offset lower end 38 of the flat strip of the bracket 10, and the nut 40 is then started on the take-up bolt. A protective cushion pad 42 may be provided on the front face of the flat strip of the bracket 10. Thus, when the nut 40 is pulled up tight, the bracket 10 is firmly fixed to the bumper.

The protective cushion pad on the flat strip also provides a more extended surface contact between the strip and the bumper than is possible in the prior art mountings such as shown in the references mentioned above. This results in a firmer and more stable mounting once it is properly tightened.

The vertical strip 44 of the bracket 12 is extended rearwardly from the bottom and then upwardly a short distance to form a brace across the bottom of the tire rack which has a rectangularly formed strip 46 fixed at the front to the front face of the vertical strip 44 and at the rear to the upper edge of the upwardly extending rear end of strip 44, and a curved strip 48 extends between the sides of strip 46 to define the curved bottom of the tire rack well. These strips may be joined by welding or by any other suitable means.

A single bumper hitch of this type may be used alone for carrying a spare tire and/or wheel, or a pair of these hitches may be used for carrying a minibike, motorcycle, scooter or bicycle, by properly spacing and adjusting the hitches on the bumper. Also, other load carrying brackets may be adapted for use with this hitch.

Many other obvious modifications in the form and details of the parts of this hitch may be made without departing from the spirit and scope of this invention.

What is claimed is:

1. An adjustable load carrying bumper hitch comprising a bumper mounting bracket positionable on the outer face of a bumper and having a pair of rearwardly extending vertical plates aligned in the same vertical plane, first and second hook means hooked over the upper and lower edges respectively of the bumper, first means for pivotally connecting said first hook means and the upper end of said bracket above said vertical plates, second means for pivotally connecting said second hook means and the lower end of said bracket below said vertical plate and including means for adjusting the force exerted by said second connecting means between said second hook means and bracket lower end, a load carrying bracket having a pair of forwardly extending vertical plates aligned in the same vertical plane, and means for adjustably connecting said mounting bracket and carrying bracket vertical plates.

2. An adjustable load carrying bumper hitch as claimed in claim 1 wherein said vertical plates have matching axially extending parallel slots, and a bolt passing through each pair of matching slots in both plates for axially adjusting said bracket with respect to each other.

3. An adjustable load carrying bumper hitch as claimed in claim 1 wherein said load carrying bracket includes a rack structure formed to receive a mini-bike tire and wheel at right angles to said vertical plates.

References Cited

UNITED STATES PATENTS

| | | | |
|---|---|---|---|
| 3,240,455 | 3/1966 | Swezy et al. | 248—43 |
| 3,300,111 | 1/1967 | Hedgepeth | 224—42.07 |
| 1,050,235 | 1/1913 | Scanlan | 248—298 |
| 1,370,453 | 3/1921 | Kilgour | 248—298 |
| 2,431,400 | 11/1947 | Iverson | 224—42.03 |
| 3,061,327 | 10/1962 | Ensinger | 280—35 |
| 3,275,206 | 9/1966 | Croft | 224—42.03 |

R. SONG, Primary Examiner

LEO FRIAGLIA, Assistant Examiner